D. De GARMO

Potato-Digger.

No. 29,252.

Patented July 24, 1860.

Witnesses:
G. Henry Roberts
Louis Ernst

Inventor:
Daniel De Garmo

UNITED STATES PATENT OFFICE.

DANIEL DE GARMO, OF ROCHESTER, NEW YORK.

IMPROVEMENT IN POTATO-DIGGERS.

Specification forming part of Letters Patent No. 29,252, dated July 24, 1860.

*To all whom it may concern:*

Be it known that I, DANIEL DE GARMO, of Rochester, in the county of Monroe and State of New York, have invented a new and useful Potato-Digger; and I do hereby declare that the following is a full and exact description thereof, reference being had to the accompanying drawings, in which—

Figure 1:
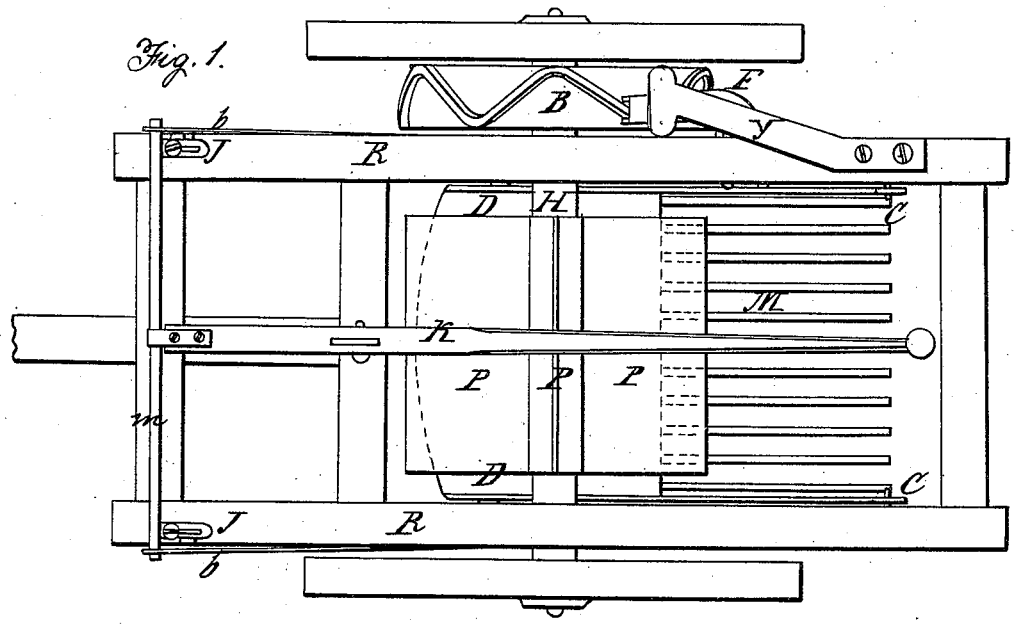
Figure 2:
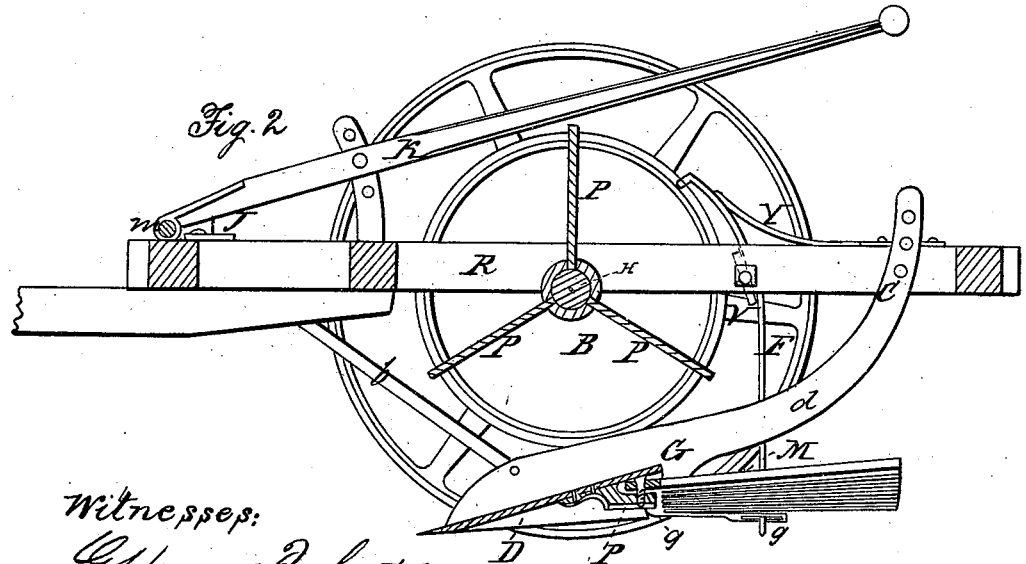

Figure 1 is a plan of the machine. Fig. 2 is a vertical longitudinal section.

The nature of my invention will be understood by reference to the drawings and specification.

R is the frame, and is hung to the axle H by journal-boxes on the under side.

The shovel D may be made of steel or iron and edged with steel, and should be inclined in the center from the edge to the rear, making the point G, Fig. 2, four to eight inches higher than the general plane, which tends to part the earth and spread it much more evenly upon the separator M, which is also arched to correspond with the shape of the shovel at their junction. The machine "clears itself" more effectually by giving the shovel and separator this peculiar shape.

The shovel is suspended by the arms $d$ and draft-straps $b$, the latter being attached to the lever K by the cross-rod $m$, which rests at each end in the notches of the gages J. The notched face of the said gages is an inclined plane, and is adjustable by means of set-screws. The rack or separator M swings on the pivot $p$. The fingers or slats of the separator may be of iron or steel, about two feet long, and may be welded or bolted to the stock $q$. The separator is vibrated by the cam B and the lever F, the lower end of which passes through the slot $g$ in the side of the rack or separator. This lever is hinged to the stud V, which is screwed into the side of the frame R, and by changing the axis of the lever up or down the shake may be increased or diminished. Said lever is kept in gear by the spring Y. The wings P revolve with the axle and act as conveyers of the earth, &c., from the shovel to the separator, rendering it impossible for the machine to "clog" in any kind of soil. Thin plates of metal or wood may be used for the said wings. By bearing the lever K down the shovel is raised out of the ground, which is necessary while turning around or moving from place to place.

The shovel may be gaged to run deep or shallow by changing the bolts C and setting the gages J forward or back, as the case may be.

One wheel should be loose on the axle to facilitate in turning around.

What I claim as my invention is—

1. Corrugating the shovel D of potato-diggers, as and for the purpose specified, and giving a corresponding arched shape to the separator M.

2. The manner of suspending the shovel D and separator M by means of the adjustable arms $d$ and the draft-straps $b$, in combination with the cross-rod $m$ and lever K, as and for the purposes specified.

3. Constructing the separator M of potato-diggers with the fingers suspended from a single rib or stock, $q$, at the front end, which leaves the interstices entirely open, thereby providing a free and unobstructed passage for the earth, vines, &c., longitudinally.

4. Giving a side shake or vibration to the rear end of the separator M, as described, the front end being hung to the shovel D by the pivot $p$, thus producing a centrifugal force, which greatly facilitates the clearing of the shovel D and separator M.

5. The revolving wings P, in combination with the shovel D and separator M, for the purpose specified.

DANIEL DE GARMO.

Witnesses:
G. HENRY ROBERTS,
LOUIS ERNST.